US008930049B2

(12) United States Patent
Mamidipudi et al.

(10) Patent No.: US 8,930,049 B2
(45) Date of Patent: Jan. 6, 2015

(54) LDV FOR AIRDROPS

(75) Inventors: Priyavadan Mamidipudi, Bristow, VA (US); Elizabeth A. Dakin, Great Falls, VA (US); Daniel C. Dakin, Great Falls, VA (US); Philip L. Rogers, Hume, VA (US); Edgar K. Dede, Manassas, VA (US); Peter Gatchell, Nokesville, VA (US); Madhukiran Panabakam, Herndon, VA (US); Lance Leclair, Manassas, VA (US); Chia-Chen Chang, Gaithersburg, MD (US); Rupak Changkakoti, Haymarket, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 101 days.

(21) Appl. No.: 13/484,565

(22) Filed: May 31, 2012

(65) Prior Publication Data

US 2013/0325213 A1 Dec. 5, 2013

(51) Int. Cl.

| | |
|---|---|
| ***G01S 17/95*** | (2006.01) |
| ***B64C 19/00*** | (2006.01) |
| ***G01S 17/50*** | (2006.01) |
| ***G01S 17/88*** | (2006.01) |
| ***G01S 17/58*** | (2006.01) |
| ***G05D 1/10*** | (2006.01) |

(52) U.S. Cl.

CPC ................ *B64C 19/00* (2013.01); *G01S 17/50* (2013.01); *G01S 17/88* (2013.01); *G01S 17/58* (2013.01); *G01S 17/95* (2013.01); *G05D 1/105* (2013.01)

USPC ............. 701/14; 701/10; 356/28.5; 356/336; 356/342

(58) Field of Classification Search

CPC ......... G01S 17/88; G01S 17/95; G01S 17/50; G01S 17/58; G05D 1/105; B64C 19/00

USPC ............ 701/3, 4, 10, 14; 356/28.5, 335–343, 356/519

See application file for complete search history.

(56) References Cited

U.S. PATENT DOCUMENTS

| | | | | |
|---|---|---|---|---|
| 4,168,906 | A * | 9/1979 | Schwiesow | 356/28 |
| 5,272,513 | A | 12/1993 | Vahala et al. | |
| 5,724,125 | A | 3/1998 | Ames | |
| 6,751,532 | B2 | 6/2004 | Inokuchi | |
| 7,499,181 | B2 | 3/2009 | Mirand et al. | |
| 7,561,067 | B2 | 7/2009 | Matayoshi et al. | |

(Continued)

OTHER PUBLICATIONS

Carr et al, Airdrop Ballistic Winds Operationally Capable Lidar, IEEE, Aerospace and Electronic Systems Magazine, 1999, pp. 31-36.*

(Continued)

*Primary Examiner* — Russell Frejd

(74) *Attorney, Agent, or Firm* — Caesar, Rivise, Bernstein, Cohen & Pokotilow, Ltd.

(57) ABSTRACT

A method of using a light detection system for increasing the accuracy of a precision airdrop is described. Radiation is transmitted to target areas between an airborne vehicle and a dropzone target. Scattered radiation is received from the target areas. Respective wind characteristics are determined from the scattered radiation and a wind velocity map is generated, based on the respective wind characteristics, between the airborne vehicle, and at least the dropzone target. An aerial release point for the precision airdrop is computed based on the generated wind velocity map and a location of the dropzone target.

18 Claims, 7 Drawing Sheets

(56) References Cited

U.S. PATENT DOCUMENTS

| | | | | |
|---|---|---|---|---|
| 7,933,002 | B2 | 4/2011 | Halldorsson | |
| 8,427,649 | B2 * | 4/2013 | Hays et al. | 356/450 |
| 2009/0046289 | A1 * | 2/2009 | Caldwell et al. | 356/341 |
| 2009/0048723 | A1 | 2/2009 | Nugent et al. | |
| 2011/0037970 | A1 | 2/2011 | Rogers et al. | |
| 2012/0050750 | A1 * | 3/2012 | Hays et al. | 356/519 |
| 2012/0206712 | A1 | 8/2012 | Chang et al. | |

OTHER PUBLICATIONS

Carr et al., "Airdrop Ballistic Winds Operationally Capable Lidar", Aerospace and Electronic Systems Magazine, IEEE, vol. 14, 5, May 1999, pp. 31-36.

O'Connor et al., "A Method for Estimating the Turbulent Kinetic Energy Dissipation Rate from a Vertically Pointing Doppler Lidar, and Independent Evaluation from Balloon-Borne In Situ Measurements", Journal of Atmospheric & Oceanic Technology, American Meteorological Society, vol. 27, 10, Oct. 2010, pp. 1652-1664.

Reineman et al., "A Portable Airborne Scanning Lidar System for Ocean and Coastal Applications", Journal of Atmospheric & Oceanic Technology, American Meteorological Society, vol. 26, 12, Dec. 2009, pp. 1652-1664.

U.S. Appl. No. 13/477,454, entitled "LDV System for Measuring Wind at High Altitude," inventor Dakin et al., filed May 22, 2012.

* cited by examiner

LDV FOR AIRDROPS

BACKGROUND

1. Field of the Invention

This disclosure relates to a system and a method to measure wind profiles around an airborne vehicle for improving the accuracy of precision airdrops.

2. Background Art

The knowledge of real-time winds is important for precision airdrop of cargo and consumables. Such airdrops are performed commonly to Forward Operating Bases as well as remote and dispersed austere locations. Recent technological advances have allowed precision airdrops to be performed at higher altitudes, taking the aircraft out of the reach of ground threats.

Newer airdrop systems provide a variety of atmospheric sensing capabilities, except for the ability to measure real-time winds. The wind information is estimated from dropsonde data as well as pilot wind reports at the aircraft's altitude. Such wind data lacks the accuracy and timeliness required for a precision drop. Furthermore, since the final descent trajectory of the payload is ballistic, the accuracy potential for a precision drop is significantly degraded by the lack of any information regarding winds near the ground.

SUMMARY

Therefore, what is needed is a compact, lightweight, and rugged aircraft mounted or ground based laser wind sensing system capable of reporting real time winds at multiple distances along a drop trajectory.

An embodiment of the present invention provides a method of using a light detection and ranging (LIDAR) system for increasing the accuracy of a precision airdrop. Radiation is transmitted to target areas between an airborne vehicle and a dropzone target. Scattered radiation is received from the target areas. Respective wind characteristics are determined from the scattered radiation and a wind velocity map is generated, based on the respective wind characteristics, between the airborne vehicle and at least the dropzone target. An aerial release point for the precision airdrop is computed based on the generated wind velocity map and a location of the dropzone target.

According to another embodiment of the present invention, there is provided a LIDAR system coupled to an airborne vehicle. The LIDAR system includes a source configured to produce a radiation beam, and a modulator configured to receive the coherent radiation beam as input from the source and to produce one or more modulated radiation beams. The system further includes one or more transceivers configured to receive the one or more modulated beams via a corresponding one or more optical fibers chosen from a first plurality of optical fibers, the one or more transceivers each configured to transmit the one or more modulated beams to target areas between the airborne vehicle and a dropzone target, and to receive one or more scattered signals from the target areas. An optical mixer is also included in the system and is coupled to the one or more transceivers via a corresponding one or more optical fibers chosen from a second plurality of optical fibers, and is coupled to the source via one or more optical fibers chosen from a third plurality of optical fibers. The optical mixer is configured to receive the one or more scattered signals from the corresponding one or more transceivers, receive one or more reference radiation beams from the coherent source, and determine, for each of the one or more transceivers, a corresponding one or more Doppler shifts based on the respective one or more reference beams and the corresponding one or more scattered signals. The LIDAR system further includes a processor configured to generate a wind velocity map between the airborne aircraft and at least the dropzone target based on the one or more Doppler shifts, and compute an aerial release point for a precision airdrop based on the generated wind velocity map and a location of the dropzone target.

An embodiment of the present invention provides another method of using a light detection and ranging (LIDAR) system for increasing the accuracy of a precision airdrop. Radiation is transmitted to target areas above a dropzone target. Scattered radiation is received from the target areas. Respective wind characteristics are determined from the scattered radiation and a wind velocity map is generated, based on the respective wind characteristics, above the dropzone target. The wind velocity map is transmitted to one or more airborne vehicles.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWING(S)/FIGURE(S)

The accompanying drawing(s), which are incorporated herein and form part of the specification, illustrate the present invention and, together with the description, further serve to explain the principles of the invention and to enable a person skilled in the relevant art(s) to make and use the invention.

FIGS. 5A-5F present graphs of wind data having horizontal and vertical components.

Figure 6:
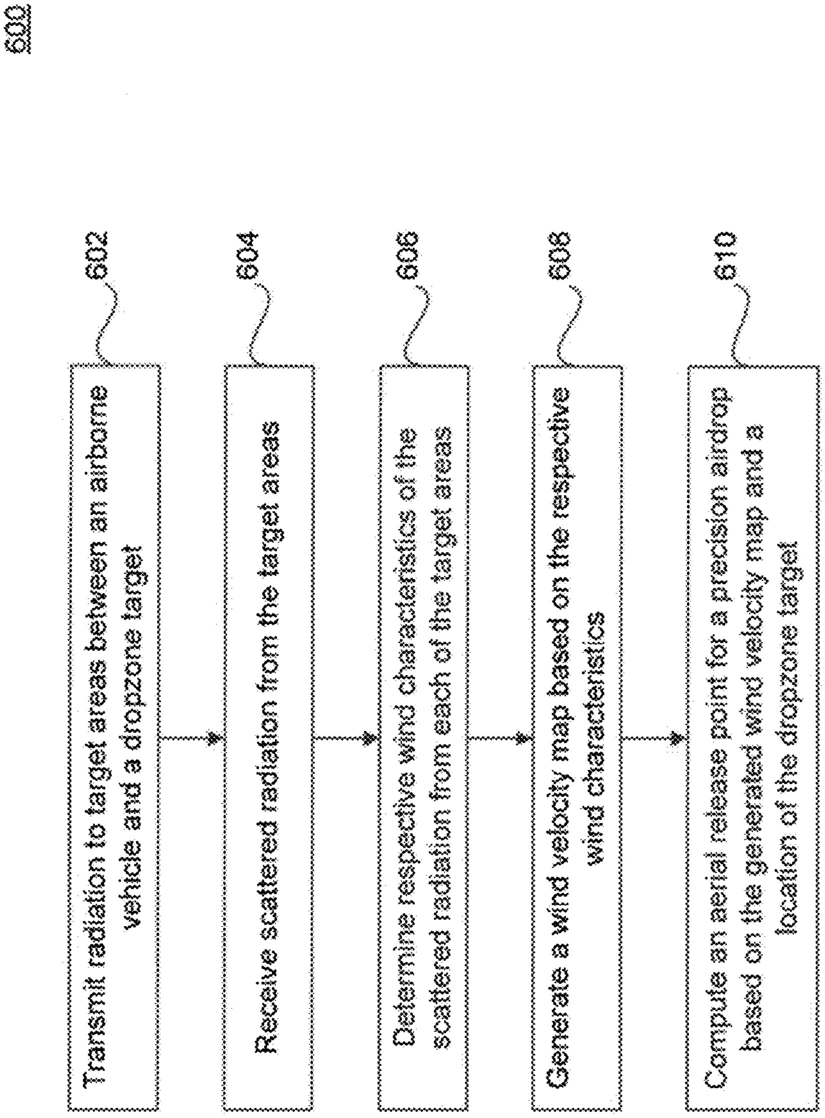
Figure 7:
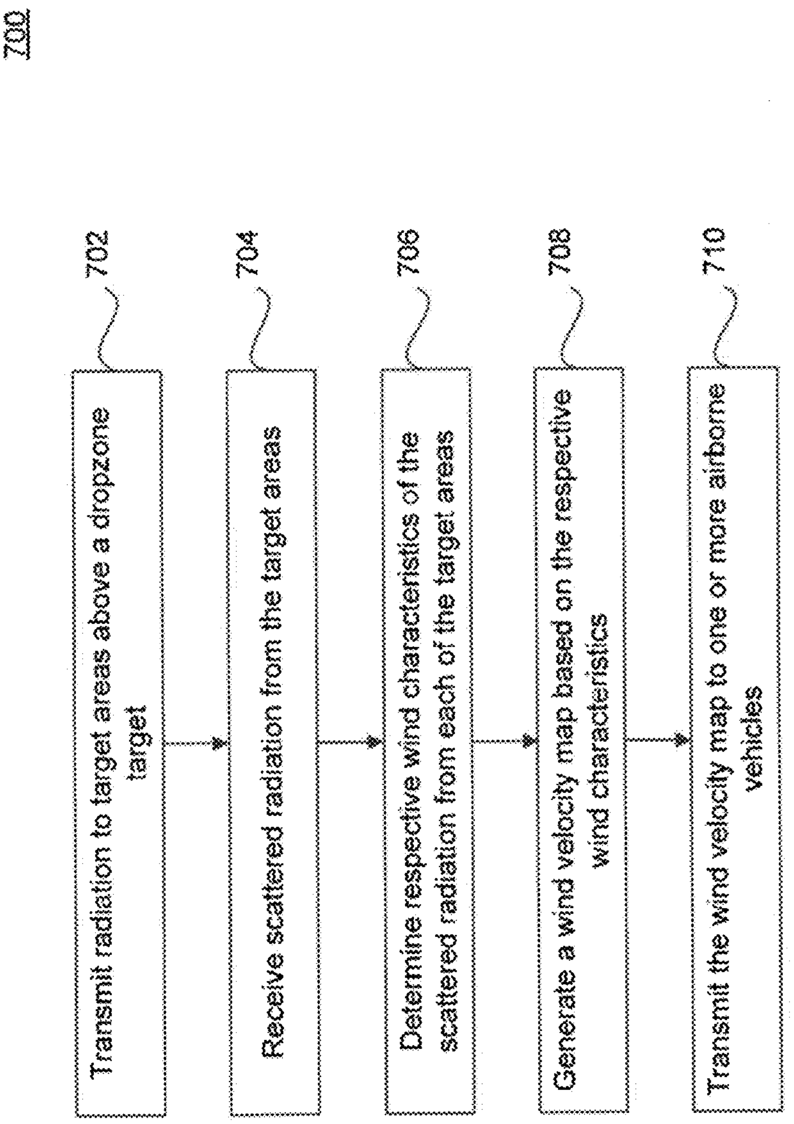

FIGS. 6-7 illustrate flowcharts of methods for improving the accuracy of a precision airdrop, according to embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s)

described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

LIDAR systems, such as laser Doppler velocimeters ("LDVs"), transmit light to a target region (e.g., into the atmosphere) and receive a portion of that light after it has scattered or reflected from the target region or scatterers in the target region. This received light is processed by the LDV to obtain the Doppler frequency shift, $f_D$. The LDV conveys the velocity of the target relative to the LDV, v, by the relationship $v=(0.5)cf_D/f_t$ where $f_t$ is the frequency of the transmitted light, and c is the speed of light in the medium between the LDV and the target. LDV's are have a wide range of applications including, but not limited to: blood-flow measurements, speed-limit enforcement, spaceship navigation, projectile tracking, and air-speed measurement. In the latter case the target consists of aerosols (resulting in Mie scattering), or the air molecules themselves (resulting in Rayleigh scattering).

In an embodiment, a LIDAR system is considered for use on an airborne vehicle to measure wind velocity at various target areas between the airborne vehicle and the ground. The wind velocity data may be used to generate a three dimensional wind map of the area between the airborne vehicle and the ground. The information may be used, for example, to improve the accuracy of precision airdrops from the airborne vehicle. It should be understood that the wind velocity data may also be taken between an airborne vehicle and a dropzone target. The dropzone target is not restricted to being located on the ground. For example, the dropzone target may be located on the top surface of a building.

In another embodiment, a ground-based LIDAR system may be used to measure wind velocity at various target areas above the dropzone target. The ground-based LIDAR system may be a handheld system or mounted to a base. In other examples, the ground based LIDAR system may be mounted to a variety of different vehicles (trucks, tanks, ATVs, etc.) The ground-based LIDAR system may also be mounted or carried on a ship or buoy. The data related to the measured wind velocities at various target areas is transmitted to one or more airborne vehicles. The airborne vehicles may then use the data to increase the accuracy of precision airdrops targeting the dropzone target.

In another embodiment, the LIDAR system may measure wind velocities at areas above, below, and in front of the aircraft to determine turbulence factors. The presence of turbulence prior to or during an airdrop may result in injury to aircraft personnel, damaged cargo, and reduction in the impact point accuracy. Based on the turbulence factors, the aircraft may be controlled to reduce the turbulence experienced by the aircraft. The control may be performed via a closed loop control system coupled with the LIDAR system. In another example, the aircraft is manually controlled by the pilot to reduce turbulence after the pilot receives instructions related to the most optimal flight path for reducing turbulence.

The signal strength of the lasers used by the embodied LIDAR system and the wavelength, e.g., 1550 nm, is certified to be eye-safe under IEC 60825-12 standards. Also, the signal experiences negligible attenuation in the atmosphere and is undetectable by conventional night vision, $I^2$, and thermal sensors. The wind measurements are not effected by atmospheric conditions such as rain, snow, etc., and are insensitive to background light, solar radiation, and temperature effects. The embodied LIDAR system can distinguish between scattered radiation returned from wind vs. radiation returned from hard targets such as birds, other aircraft, the ground, etc.

Both the LIDAR system aboard the aircraft and the ground-based LIDAR system may be implemented partially or wholly using an all-fiber optic infrastructure or a photonic integrated circuit configuration to reduce the weight and increase portability. Further details regarding the design of the LIDAR system as well as the measurement concept for producing the three dimensional wind map are described herein with reference to the various drawings. In one example, the LIDAR system is one part of a larger sensing system that includes suitable software and/or hardware operable to determine a three dimensional wind map around or near an aircraft and calculate an aerial release point based on the wind map.

Figure 1:
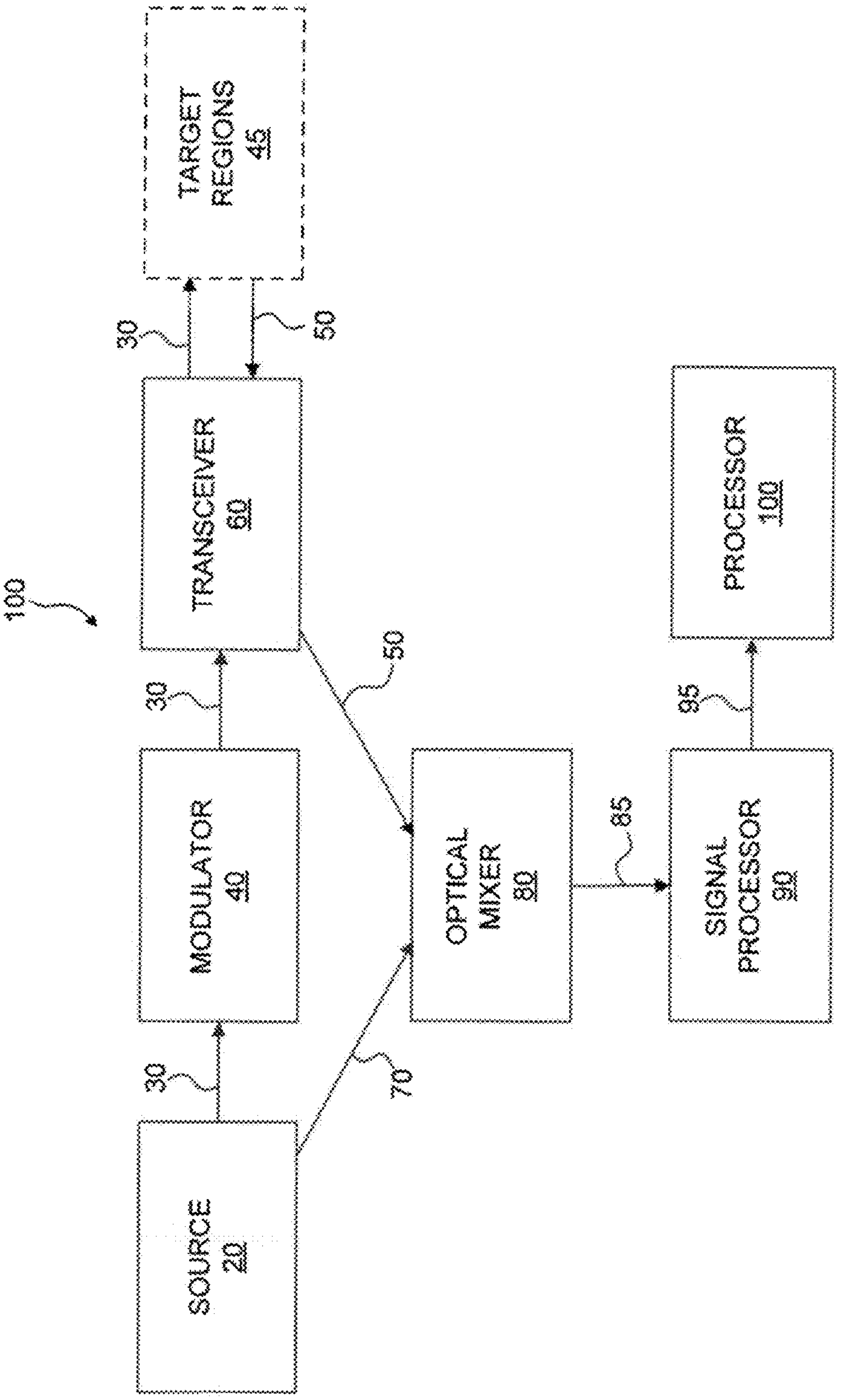
FIG. 1 illustrates a LIDAR system, according to an embodiment.

FIG. 1 illustrates a LIDAR system 10. For example, LIDAR system 10 can be similar to the LIDAR system disclosed in U.S. Pat. Nos. 8,508,723, 8,508,722, and 5,272,513, which are hereby incorporated by reference in their entireties. In one example, LIDAR system 10 includes a source 20, a modulator 40, a transceiver 60, an optical mixer 80, and a signal processor 90. In one example, each path between elements comprises a waveguide, e.g., fiber optic, instead of free space.

In one example, LIDAR system 10 includes a source 20 of coherent light which may, if desired, be polarized. Source 20 projects a first coherent beam of light 30. Light 30 is received at modulator 40, e.g., also called a beam shaper. Beam shaper 40 can be used to expand and/or collimate beam 30. Light 30 exiting modulator 40 is received at transceiver 60. Transceiver 60 projects beam 30 in nearly collimated form into a target region 45. In one example, beam 30 is projected up to 4500 feet from transceiver 60. Target region 45 may, for example, be a region between an airborne vehicle and a dropzone target. LIDAR system 10 may be configured to measure from many target regions at different distances between the airborne vehicle and the dropzone target.

The collimated beam strikes airborne scatterers (or air molecules) in target region 45, resulting in a back-reflected or backscattered beam 50. A portion of backscattered beam 50 is collected by transceiver 60 or to an adjacent receiver (not shown). The case where the same transceiver transmits and receives the light is known as a monostatic configuration, while the case of separate transmitters and receivers is known as a bistatic configuration. Monostatic configurations can only receive scattered light. Bistatic configurations can be arranged to receive light that is substantially scattered or at any other angle relative to transmitted beam 30.

Backscattered beam 50 is collected by transceiver 60 is then directed by transceiver 60 to mixer 80. Mixer 80 combines a separate reference beam of light 70 with beam 50. An ideal optical mixer combines the two beams in such a way that they have the same polarization and occupy the same space, and directs the result onto a photo detector with a bandwidth sufficient to detect the measured Doppler frequency shift. The photo detector produces an electrical current 85, which includes a component whose frequency is the mathematical difference between the frequency of the reference beam 70 and the backscattered beam 50. The electrical current 85 is then analyzed by a signal processor 90 (e.g., electrical spectrum analyzer or a frequency counter) to determine the Doppler frequency shift and calculate the relative velocity component along the axis of transceiver 60 between LIDAR system 10 and target region 45.

Ambiguities regarding whether the measured relative frequency is either positive or negative can be resolved by using the "in-phase and quadrature" detection method, as is known in the art. Another approach to resolving these ambiguities is to apply a stable, constant frequency shift either to transmitted beam 30 or to reference beam 70 (e.g. by using an acousto-optic cell). This creates an alternating current component in the electrical signal 85 with a frequency that is the sum of the constant frequency shift and the Doppler frequency shift, removing the directional ambiguity. A LIDAR system wherein the frequency of transmitted beam 30 and the frequency of reference beam 70 are identical is said to use homodyne detection. Heterodyne detection is used when the frequencies of transmitted beam 30 and reference beam 70 are different.

Reference beam 70 is selected to have a well-defined and stable optical frequency that bears a constant phase relationship with transmitted beam 30. This is known as coherence. The requirement for coherence is easily achieved by using a laser as source 20 and tapping source 20 to create reference beam 70 by means of an optical splitter (not shown).

In an embodiment, signal processor 90 is coupled to a processor 100 via an electrical means 95. Electrical means 95 may be a DC or AC current passing through a conductor, or any form of electromagnetic radiation to provide wireless communication between signal processor 90 and processor 100. Processor 100 may generate a wind velocity map between the airborne vehicle and at least the dropzone target based on the measured Doppler frequency shifts from one or more target regions, such as target region 45. Processor 100 may by further configured to compute an aerial release point for a precision airdrop based on the generated wind velocity map and a location of the dropzone target. Processor 100 may represent a single processor or multiple processors or processor "cores".

Source 20 can be either a $CO_2$, Nd:YAG, or Argon Ion laser (preferably lasing in the fundamental transverse mode and in a single longitudinal mode). However, air-speed targets (aerosols and/or molecules) generate very weak return signals compared to solid objects. Thus air-speed LIDAR systems incorporating these laser sources that work over a range of hundreds of meters require large amounts of laser power and are thus too large, bulky, heavy, fragile and possibly dangerous to be used in many desirable applications like air-speed determination for aircraft. In an embodiment, source 20 produces emission wavelengths within the near-to-short infrared portion of the spectrum. In one example, source 20 produces radiation at 1064 nm. In another example, source 20 produces radiation at 1550 nm.

However, source 20 can also be a lightweight, low-cost, highly efficient, rare-earth-doped glass fiber (referred to hereafter as a fiber laser). Fiber lasers have several advantages over other laser sources. Fiber lasers can be efficiently pumped by laser diodes whose emission wavelengths have been optimized for excitation of the rare-earth dopant. This makes the fiber lasers very energy efficient and compact, eliminating the need for cooling systems, flash lamps, and high current electrical sources. Moreover the glass fiber serves as a flexible waveguide for the light, eliminating the need for bulky optical components like mirrors and lenses that require rigid mechanical mounts in straight lines with stringent alignment tolerances. Fiber lasers are also more adaptable than solid-state lasers: the pulse repetition frequency ("PRF") and pulse width in fiber lasers may be changed "on the fly," while the PRF and pulse width in solid-state lasers are bound to narrow ranges or are even fixed. Source 20 can also include a laser diode coupled to an optical fiber. In an embodiment, source 20 is capable of producing thousands of laser pulses per second.

Despite advances in conventional LDV's, improvements are still necessary. Sometimes it is desirable to locate source laser 20 at a different, more accessible, location than transceiver 60. For example, when mounted to an airborne vehicle, the source may be located in a protective chassis while the transceiver may be separate from the chassis and coupled via one or more optical fibers. Other components such as modulator 40 optical mixer 80 may also be disposed within the chassis for protection. In sailing applications, the source is preferably located within the hull of the ship where it is protected from exposure to the elements.

Although these remote configurations can be made more conveniently by using optical fiber to connect source laser 20 and transceiver 60 some problems have been observed. The large optical power required for air speed measurements becomes limited by a non-linear effect that occurs in fiber optics known as stimulated Brillouin scattering ("SBS"). In fact, the longer a fiber optic is, the lower this limit becomes. The SBS power limit depends on other factors known to those skilled in the art, but it is a fundamental physical property of light traveling through transparent media and cannot be ignored.

Embodiments of the present invention provide a LIDAR system with no moving parts and which is lightweight enough to be used for many different applications which were, up to this point, not practical. The disclosed LIDAR system includes an active lasing medium, such as e.g., an erbium-doped glass fiber amplifier for generating and amplifying a beam of coherent optical energy and an optical system coupled to the beam for directing the beam a predetermined distance to a scatterer of radiant energy. The reflected beam is mixed with a reference portion of the beam for determining the velocity of the scatterer.

In using this device to measure wind velocity in the transceiver focal volume, the velocity component that is measured is that component along the axis of the transceiver. Therefore, for measurement of the "n" components of velocity, n independent measurements must be made along n non-collinear axes (where n is an integer). To accomplish this task n duplicate transceivers are disclosed, each carrying either a continuous wave ("CW") beam or are simultaneously pulsed with a common seed laser source. Simultaneous pulsing and transmission through the n transceivers has the advantage that the velocity measurements each arise from the same moment in time, instead of from sequential moments in time. Thus, the resulting velocity determinations are more accurate as a result of simultaneous pulsing and transmission instead of sequential transmission.

By using optical fiber for both generation of the laser energy as well as wave guiding of the energy, the present disclosure provides a single, mechanically flexible conduit for light. This configuration allows the system to be more robust to vibration and temperature variation than a corresponding system comprising free space optical components. The only point at which light leaves the optical fiber system is for projection from the respective transceivers. Each of the optical fibers that transmits light is also the same fiber used to receive scattered light and thus the aerosol-scattered return beam is automatically aligned with the respective transceiver-fiber optic collection systems.

The use of fiber lasers such as e.g., erbium-doped optical fiber also has advantages in terms of the overall energy efficiency of the system. Because diode lasers are now available at the optimal pump wavelength of erbium doped glass, the erbium wave guide can be efficiently pumped by launching pump radiation down this wave guide. Thus, the system has greatly reduced cooling requirements and can operate off of a low voltage battery supply.

The disclosed velocimeter system is also eye-safe, lightweight, and easily scaled to high energy per pulse or CW operation. As described above, the velocimeter has "n" lines of sight. Thus, in order to determine an object's velocity or the wind velocity in one or more target regions, n transceivers are used, each simultaneously projecting a beam of light along a different axis. To determine three-dimensional velocity, as with wind velocity, three transceivers are used. To determine two- or one-dimensional velocity, e.g., for a car or boat moving on a plane or in a line, fewer transceivers may be used. The laser beams projected from the n transceivers are each pumped simultaneously and arise from a single laser source. The source may be co-located with the n transceivers, or may be located remotely with respect to the n transceivers. If the laser source is remotely located, fiber optic cables are used to carry the generated light beams to each transceivers. As described below in greater detail, a seed laser from the source is amplified and, if desired, pulsed and frequency offset, and then split into n source beams. The n source beams are each delivered to an amplifier assembly that is located within the n transceiver modules, where each of the n transceiver modules also includes an optical system such as a telescope. Amplification of the n source beams occurs at the transceiver modules, just before the n beams are transmitted through the optical system to one or more target regions. Thus, when the n source beams are conveyed through connecting fibers from the laser source to each of the n transceivers, the power of each of the source beams is low enough so as not to introduce non-linear behaviors from the optical fibers. Instead, power amplification occurs in the transceiver module, just before transmission from the optical system. Consequently, fiber non-linear effects are not introduced into the system.

The placement of the power amplifier within the transceiver modules just before laser beam projection through a lens reduces the effect of nonlinear fiber behavior that is normally observed when there is a greater propagation distance between the power amplifier and the lens. In this way, the disclosed LIDAR system is able to use a single seed laser and amplifier assembly that is remote from the power amplifier. The seed laser generates a beam that may be amplified, pulsed, and frequency shifted before the beam is split, if necessary, and directed to the remote power amplifiers. Power amplification only occurs just before transmission of the source beam through the lenses. Thus, as long as the amplified result is still within the linear operating region of the fiber to the remote amplifier, the disclosed LIDAR system avoids the problems associated with non-linear fiber operation.

By using the disclosed LIDAR system, object or wind velocities may be measured with a high degree of accuracy. Because the source laser is split into n beams, the measurements taken along all of the n axes are simultaneous. Additionally, splitting the source beam into n beams does not necessarily require that the source laser transmit a laser with n times the necessary transmit power, because each of the n beams are subsequently power amplified before transmission. The n beams may each be directed towards the same target region or may be directed to multiple target regions. A single beam may be used to simultaneously measure velocities at multiple points or span along a single axis. Additionally, the disclosed LIDAR system has no moving parts, and is thus of reduced size and improved durability. As explained below, the disclosed LIDAR system may be used with a platform motion sensing device such as e.g., an inertial measurement unit ("IMU") or global positioning satellite ("GPS") unit so that the motion of the LIDAR system may be compensated during calculation of the measured velocities. Thus, because of the light-weight and non-bulky nature of the LIDAR system, and because of the LIDAR system's ability to compensate for platform motion, the disclosed LIDAR system may be mounted on any moving platform (e.g., a helicopter, a boat, a commercial airliner, etc.) and still obtain highly accurate readings.

It should be appreciated that outputs from one or more transceivers may be used to determine wind profiles at various locations around an aircraft. In an embodiment, a single transceiver may use a combination of beam splitters and lenses to provide one or more collimated beams to various regions around an aircraft, and to receive one or more backscattered beams from one or more target areas. In another embodiment, multiple transceivers may be used to provide more than one collimated beam to various target areas between an aircraft and a dropzone target. Further details regarding how the wind data is collected from each target area is described herein with reference to FIGS. 4A-4B.

Figure 2:
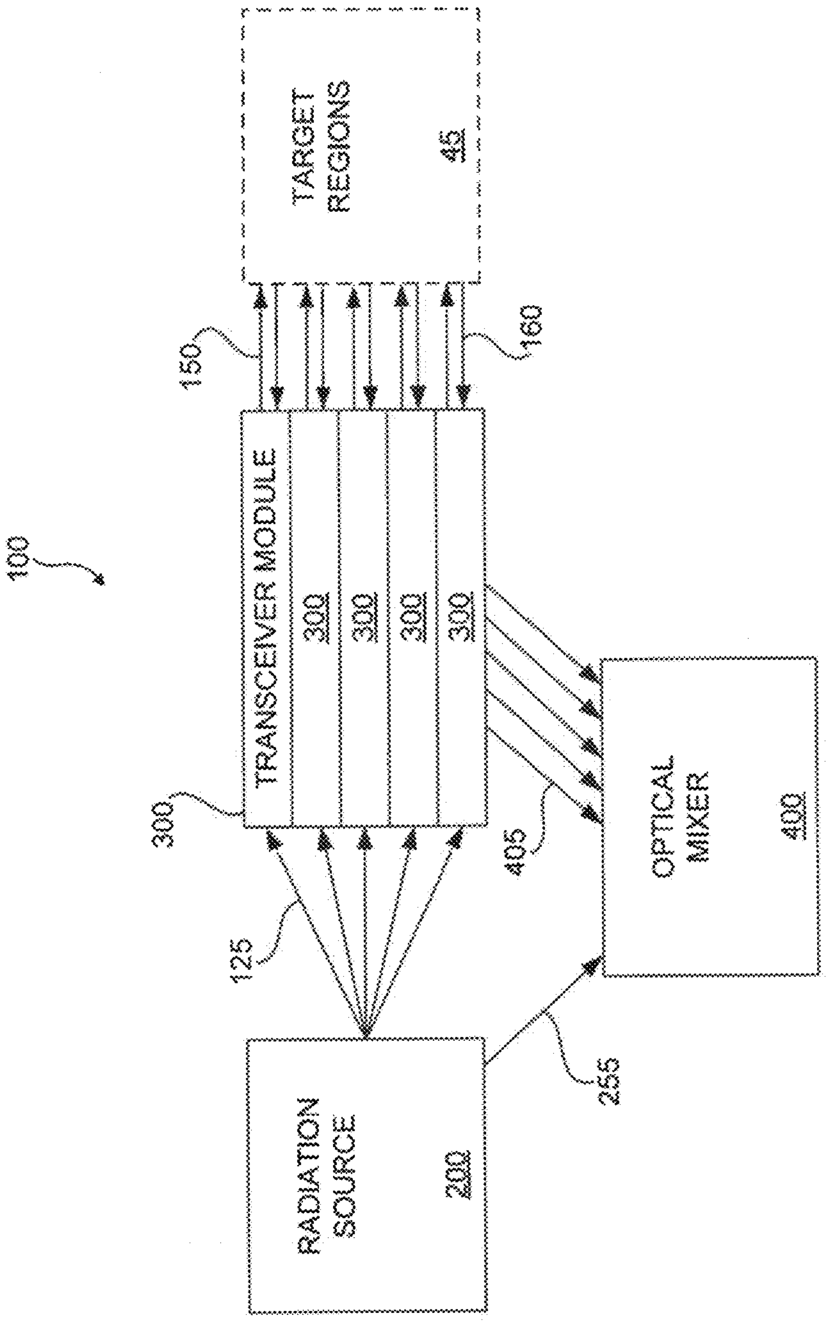
FIG. 2 illustrates an embodiment of a laser Doppler velocimeter with multiple transceivers.

FIG. 2 is a block diagram illustrating an n-axis laser Doppler velocimeter system 100. The system 100 includes a radiation source module 200, n transceiver modules 300, and an optical mixer 400. Each of the modules are described in detail below. The radiation source module 200 generates n source beams 125 to the n transceiver modules 300. The n transceiver modules 300 are for transmitting n beams of light 150 and receiving n scattered or reflected beams of light 160. The transceiver modules 300 may be located in a physically separate location than the radiation source 200 and the optical mixer 400. Alternatively, depending upon the application, all modules may be co-located. The radiation source module 200 also outputs a reference beam 255 to the optical mixer 400. The optical mixer 400 combines the reference beam 255 with each of the scattered/reflected beams 160 received by the n transceiver modules 300 that are passed on to the optical mixer 400 via optical fiber 405. Doppler shifts and hence, velocities, are calculated from the results of the combined signals.

Although not all applications of the disclosed LDV 100 require platform motion compensation, the disclosed LDV 100 (or at least the transceiver module 300 of the LDV 100) is portable and may easily be located on a moving platform such as a boat, ground vehicle or aircraft. As discussed above, the LDV 100 directly measures the relative motion of air scatterers with respect to the transceiver module 300 by detecting the Doppler frequency shift. If the LDV 100 is fixed to the ground, then its measurement is the wind speed and direction. However, an LDV. 100 undergoing linear motion measures the relative wind speed and direction. If the linear speed and direction of the moving platform is known, then the wind speed can be extracted from the relative wind measurement. Additionally, the LDV 100 may undergo both linear and rotational motion as encountered on floating platforms or on an aircraft in flight. The rotational motion introduces an additional frequency shift since the optical focal volumes are moving rapidly through the air. This frequency shifts yields a speed measurement that is not necessarily useful to (1) meteorologists since it does not represent wind or (2) navigators since it does not represent relative wind. This rotational component must be isolated and compensated for in order to report useful wind data.

As mentioned previously, the highly accurate wind velocity data measured from the LIDAR system may be used to accurately predict the trajectories of airdrops and improve accuracy of hitting a dropzone target, according to an embodiment. The payload to be used during an airdrop is typically very expensive and/or critical for the mission success. If the payload "drifts" to an undesirable location far from the targeted dropzone, it can have dire consequences. In fact, many military payloads are equipped with an explosive device configured to detonate if the payload strays too far from its targeted landing site to keep the materials from falling into the wrong hands. It is equally important to ensure that airdropped explosives such as bombs impact at their desired target.

Figure 3:
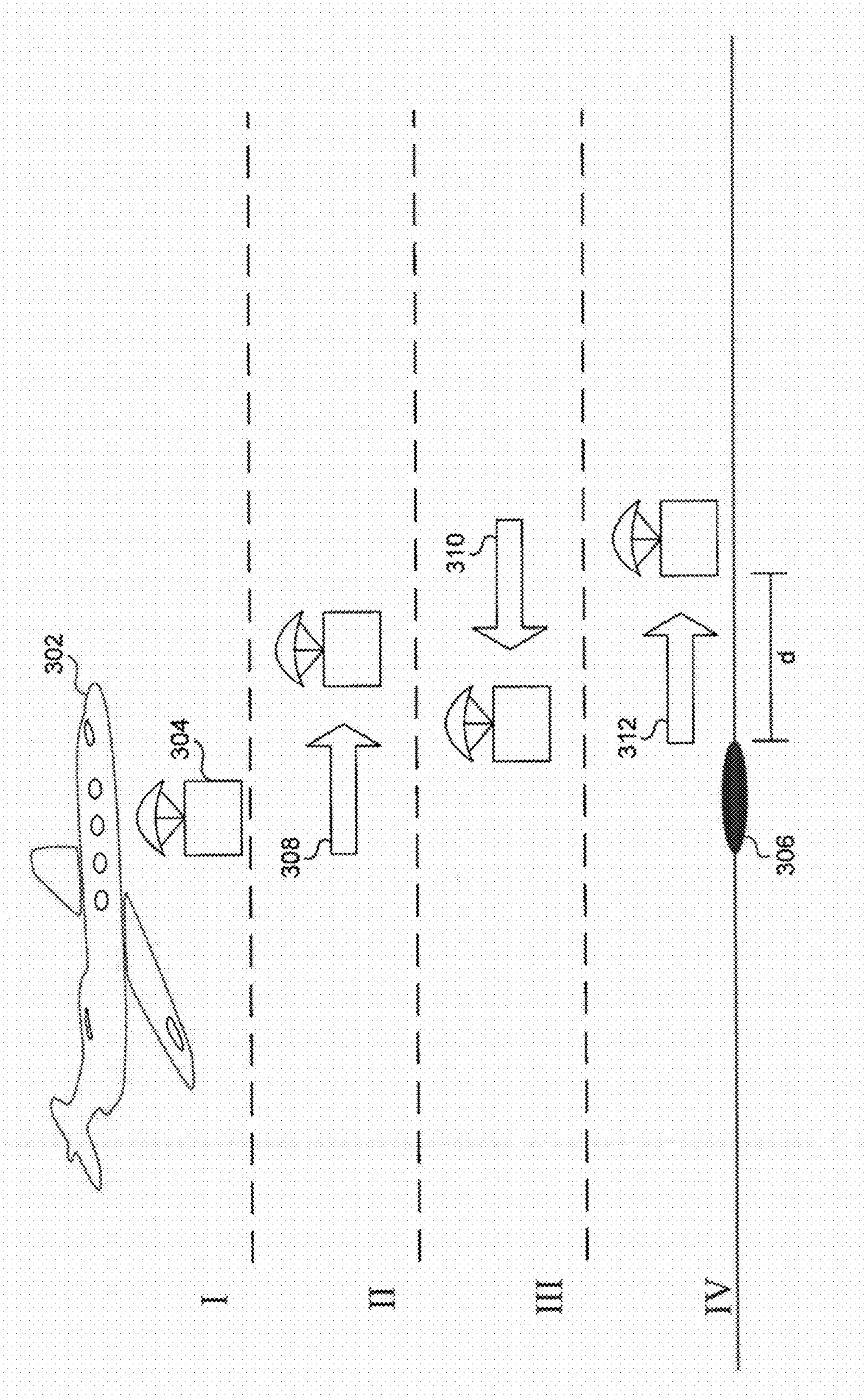
FIG. 3 illustrates an example airdrop performed without detecting any wind characteristics.

FIG. 3 illustrates an air drop. In one example, an airborne vehicle 302 drops any object or payload 304 so that it ideally lands at a dropzone target 306. In this example, the airdrop mission occurs without measuring wind between airborne vehicle 302 and dropzone target 306. It should be understood that the various illustrated wind directions and time windows are exemplary and are not intended to be limiting in any way. Indeed, any number of wind "slices" in any direction may be considered for their effect on the trajectory of a payload dropped from airborne vehicle 302. In one example, a wind slice is a certain mxn region of atmosphere (e.g., 100 m×100 m) that is located a certain distance, or periodic distance, from either the ground or an aircraft. The time that the payload is in the air during a precision airdrop may be, for example, on the order of 6 minutes.

During a first time window (I), a payload 304 is dropped from airborne vehicle 302. Payload 304 is dropped, for example, directly overhead of dropzone target 306 and is intended to land within dropzone target 306. Payload 304 may be anything, e.g., but not limited to, people (with parachutes or otherwise equipped), supplies, devices, vehicles, cargo, food, an explosive device, crates, or the like.

During a second time window (II), payload 304 has entered a region where a first wind profile 308 causes payload 304 to drift off-target. In the example illustrated, payload 304 drifts to the right of the intended dropzone target 306.

During a third time window (III), payload 304 has dropped further towards the ground and has entered another region where a second wind profile 310 causes payload 304 to drift in another direction. In the example orientation illustrated, payload 304 drifts back to the left slightly.

During a fourth and final time window (IV), payload 304 is approaching close to and eventually touching down on the ground. The region is associated with a third wind profile 312 that further blows payload 304 away from dropzone target 306. Due to the various winds found in each region between airborne vehicle 302 and dropzone target 306, payload 312 ultimately touches down at a distance d, away from dropzone target 306. Depending on the mission and the payload, the magnitude of this distance could have disastrous consequences.

Figure 4B:
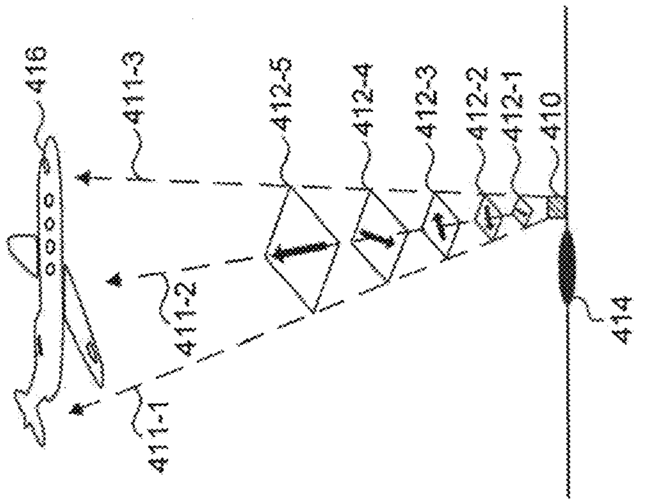
FIGS. 4A-4B illustrate example airdrops performed while using an embodiment of a LIDAR system.
Figure 4A:
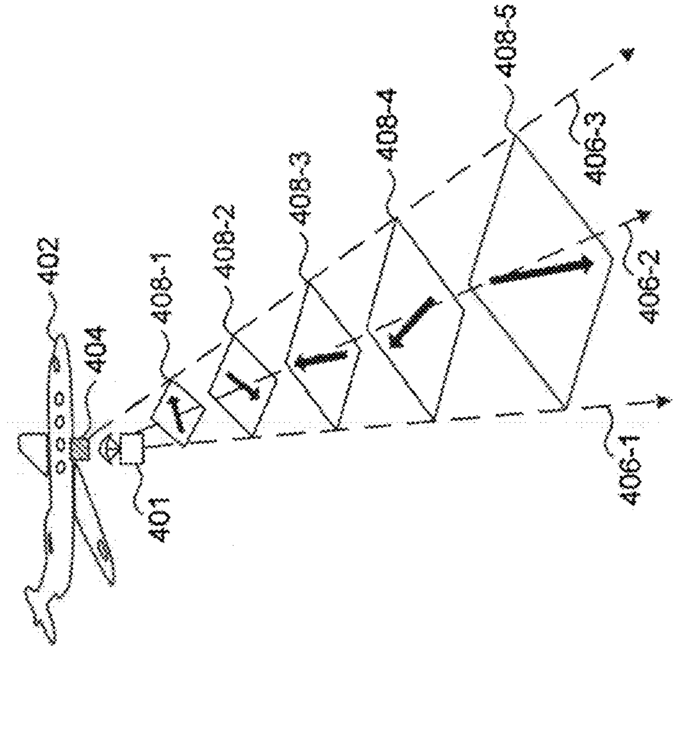

FIGS. 4A-4B illustrate periodic "wind slices" between an airborne, vehicle and ground, according to an embodiment. Each of these "wind slices" is periodically measured to determine real-time data regarding the wind characteristics in each slice. For example, this can be accomplished using one or more LIDAR systems as described in FIGS. 1 and 2. Thus, in this example, there are two periodic scenarios: a periodic distance between the airborne vehicle and ground for each slice and a periodic duration of time between each measurement of each slice. In one example, if an airborne vehicle is at 50,000 feet above the ground, each slice can be at 5,000 feet and each measurement can be made every hundredth of a second. This can ensure tight control of the airdrop, as discussed in more detail below, to make airdrops more accurate. Although discussed as measurements made from the airborne vehicle looking down, the measures may be made from the ground looking up, or both from the airborne vehicle looking down and the ground looking up. These measurements may be transmitted wirelessly via many different telecommunications systems (e.g. RF transmission, satellite downlink/uplink, etc.).

In an embodiment, a LIDAR system 404 produces three beams of radiation 406-1, 406-2, and 406-3 and directs the beams towards the ground from an airborne vehicle 402. In one example, the beams of radiation are directed towards a dropzone target on the ground. It should be understood that LIDAR unit 404 may produce any number of beams of radiation. Additionally, one or more of the beams of radiation may be configured to determine a distance or range to a particular object or to the ground. In an example, at least three of the produced beams of radiation are used to construct a three-dimensional wind map below airborne vehicle 402. The beams of radiation produced by one or more transceivers of LIDAR system 404 may travel up to 4500 feet from the one or more transceivers. In another example, the distance that the beams of radiation travel can be extended through the use of one or more amplifiers or other optical modulating components.

As described previously, the various beams of radiation 406-1, 406-2, and 406-3 produce scattered, e.g., front, side, and backscattered, radiation from aerosols and other particulates in the air. The scattered radiation is collected by LIDAR system 404 and used to determine the wind velocity at the airmass from where the scattered radiation originated from. In this way, the wind velocity at various airmass regions below airborne vehicle 402 may be determined. For example, airmass 408-1 through 408-5 may represent various "slices" in which the wind velocity is to be determined. The wind characteristics, e.g., velocity, speed, direction, etc., may be different in each of the various airmasses as denoted by the size and direction of the arrows illustrated in each airmass. Although only 5 airmasses are labeled in FIG. 5A, it should be understood that any number of airmasses may be measured by LIDAR system 404. In an embodiment, scattered radiation is collected from at least six target airmass areas. Each airmass may be considered similar to the target regions described in regards to FIGS. 1-2.

Various methods for measuring the wind velocity at multiple airmasses may be considered. In an embodiment, the scattered radiation is collected continuously or periodically from all airmasses 408-1 through 408-5. The time the radiation takes to return to LIDAR system 404 is used to determine distance between a particular airmass and the LIDAR system 404. For example, scattered radiation from airmass 408-1 will return to LIDAR system 404 before scattered radiation from airmass 408-2, which would return scattered radiation before airmass 408-3, etc.

In one example, the sensor collecting the scattered radiation on LIDAR system 1004 may take "snapshots" at various times of the collected radiation and equate the time the snapshot was taken to a distance that the scattered radiation has traveled. In another embodiment, various laser pulses produced by LIDAR system 404 are frequency modulated to keep track of the return times for the scattered radiation.

By collecting real-time data regarding wind velocity at various airmass locations below airborne vehicle 402, a three dimensional wind map is generated by volume-averaging the collected data. The wind map may be provided to an operator of the air drop, a person jumping from the vehicle, or a pilot of airborne vehicle 402 via, for example, a display on an instrument panel. The wind map may be used along with a given location of a dropzone target to calculate an aerial release point for a payload 401.

According to this embodiment, given the measured wind Conditions, payload 401 would be expected to land with a greatest probability at the dropzone target if released at the calculated aerial release point. In one example, a controller may be configured to operate various actuator systems onboard airborne vehicle 402 to move airborne vehicle 402 towards the aerial release point based on the generated wind map.

In one example, real-time calculation of an aerial release point would be quicker and more accurate than the conventional method of relying on downloading hours of past wind data from the Joint Air Force Army Weather Information Network (JAAWIN). In addition, since the wind related measurements are taken in real time, location information from, for example, a global positioning system (GPS), may be coupled with the wind measurements to generate both a time and location stamped three dimensional wind map.

In the embodiment described above, payload 401 does not have any active movement systems, e.g., propulsion systems, steering systems. In another embodiment, payload 401 includes some apparatus for propulsion or steering. In one example, payload 401 includes side propulsion systems that can steer the trajectory of payload 401 as it drifts towards the ground. Thus, payload 401 may be steered based on the generated wind map in real time as payload 401 drifts between various airmasses 408-1 to 408-5. In another example, a steering program is created based on the generated wind map for the descent and preloaded into a memory or database associated with payload 401. Alternatively, if "wind slice" measurements are continuously or periodically made the measurements can be transmitted to the payload 401 during its decent to control the propulsion or steering apparatus.

Other wind related data may be analyzed as, well from the scatter of beams 406-1 to 406-3. For example, data related to turbulence around airborne vehicle 402 may be collected. Additionally, data related to headwinds and tailwinds may be used for navigational planning. Further details regarding the use of the embodied LIDAR system for these applications can be found in co-owned application Ser. No. 13/477,454, which is incorporated by reference herein in its entirety.

In one example, LIDAR system 404 may be mounted on any suitable area of airborne vehicle 402 to allow for radiation beams 406-1, 406-2, and 406-3 to travel below airborne vehicle 402. In one example, the various transceivers that at least one of emit beams 406-1 through 406-3 and collect scattered radiation are gimbal-mounted and controlled to face towards a dropzone target. Other mounting options are available as well and could depend on typical environmental conditions or the types of missions that airborne vehicle 402 is assigned. In another embodiment, LIDAR system 404 includes a chassis that houses the active optical components and is located in an avionics bay on airborne vehicle 402. The various transceivers of LIDAR system 404 may be connected to the chassis via one or more optical fiber cables. LIDAR system 404 is designed to operate using power supplied from the aircraft, for example, 28 volts DC. In other embodiments, LIDAR system 404 receives power from its own internal source, or receives power via energy harvesting from the environment (solar, wind, etc.)

FIG. 4B illustrates a similar airdrop scenario to that shown in FIG. 4A, except that a ground-based LIDAR system 410 is used instead to measure the wind speeds at various airmasses 412-1 through 412-5 above the ground via emitting radiation beams 411-1, 411-2, and 411-3. In one example, LIDAR system 410 is located near dropzone target 414 to collect wind data directly above dropzone target 412. The wind data may be used to generate a three-dimensional wind map as previously described with regards to FIG. 5A. The wind map data may be transmitted to an aircraft 416 in the area, or to multiple aircrafts. The data may be transmitted using any method as would be known to one skilled in the relevant art(s), e.g., RF transmission, satellite uplink/downlink, etc.

In another example, around-based LIDAR system 410 may be a handheld unit and operated by a single user on the ground. Alternatively, ground-based LIDAR system 410 may be mounted to a base on the ground with various transceivers pointed upwards.

Using traditional wind measurement devices, it is difficult to gauge the significance of vertical winds in the atmosphere. The effect of vertical wind is often disregarded due to the common belief that it averages to zero. This assumption is typically true if one considers the movement of air over long periods of time (on the order of days) at a single location. However, this assumption is incorrect on the timescales that are relevant for aerial release point calculations as the payload is never in a single location for any significant period of time. Therefore, according to an embodiment of the present invention, the effect of vertical winds and turbulence can also be applied when computing an aerial release point to ensure accuracy of the impact location.

Figure 5:
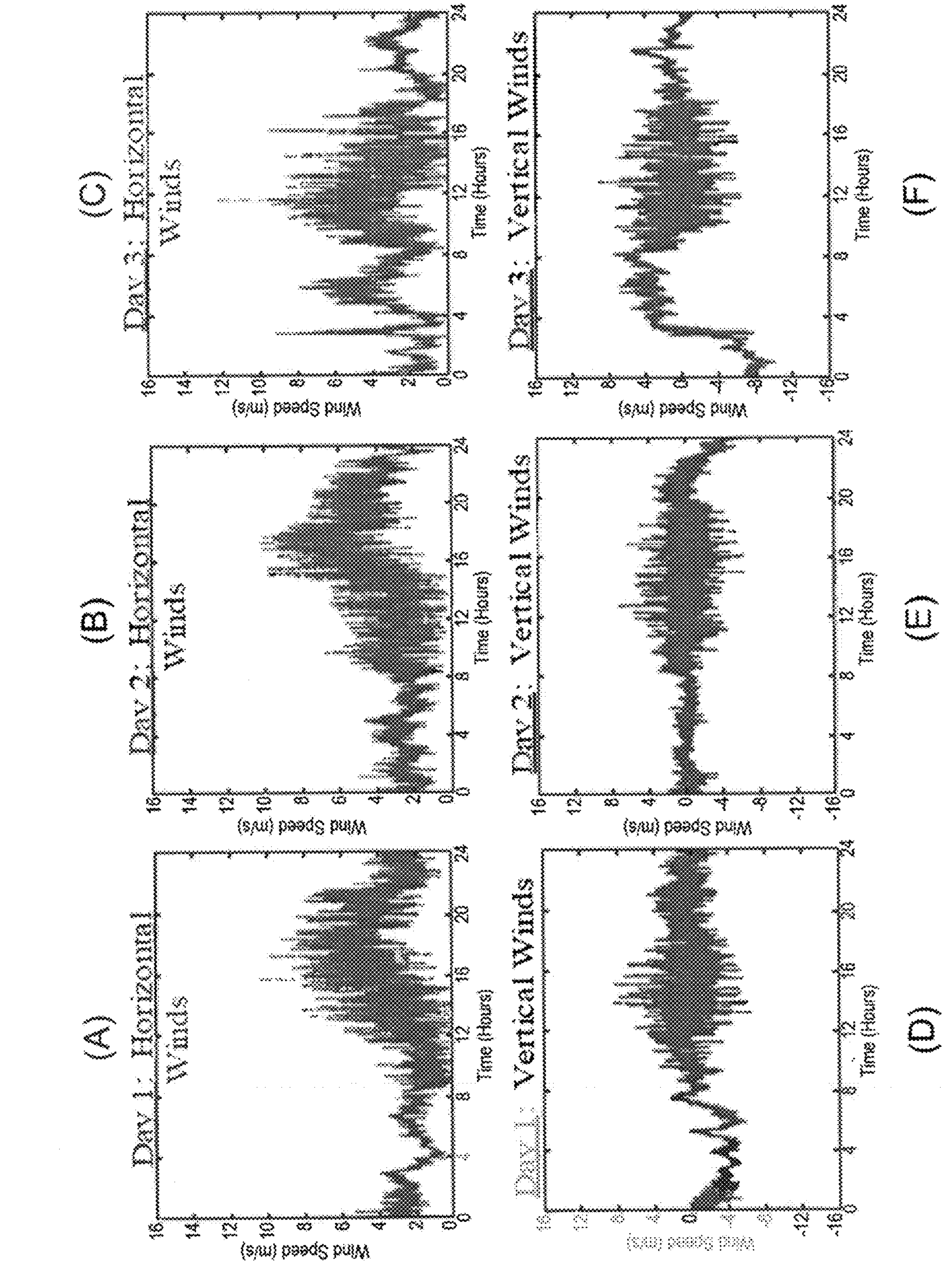

FIGS. 5A-5F display graphs representing both horizontal and vertical wind speeds, according to an embodiment. FIGS. 5A-5C display horizontal wind speeds, while FIGS. 5D-5F display vertical wind speeds. These figures clearly indicate the presence of vertical wind, and that the vertical wind fluctuates at the same rate and over the same magnitude as the horizontal wind component. These figures also show that the vertical winds cannot be estimated from the horizontal winds, do not average away over the relevant time periods, and cannot be predicted from models with the required accuracy. The embodied LIDAR system is capable of measuring both horizontal and vertical winds at any points along the produced beams of radiation.

FIGS. 6 and 7 illustrate flowcharts of methods 600 and 700 representing various embodiments of the present invention. It is to be appreciated that not all steps may be needed for each method and the steps may be performed in a different order than is shown. Each of these alternatives is contemplated within the scope of the present invention.

FIG. 6 is a method 600 of using a LIDAR system for increasing the accuracy of a precision airdrop, according to an embodiment of the invention. Each of stages 602-610 may be performed by one or more mounted LIDAR systems on an aircraft.

At stage 602, according to an embodiment of the present invention, radiation is transmitted to target areas between an airborne vehicle and a dropzone target as previously described. For example, radiation beams 406-1, 406-2, and 406-3 are transmitted below airborne vehicle 402 as illustrated in FIG. 4A.

At stage 604, according to an embodiment of the present invention, scattered radiation is received from the target areas as previously described.

At stage 606, according to an embodiment of the present invention, respective characteristics of the scattered radiation from each of the target areas are determined. These characteristics may include one or more of a wind profile which contains speed and direction information, temperature, humidity, air pressure, etc. Additionally, these characteristics include wind velocities in any direction (including a vertical direction) at multiple points along an axis of one or more beams of radiation produced by the LIDAR system.

At stage 608, according to an embodiment of the present invention, a wind velocity map is generated based on the respective wind characteristics between the airborne aircraft and at least the dropzone target. In one example, the wind velocity map is associated with time and location stamped data provided by a GPS.

At stage 610, according to an embodiment of the present invention, an aerial release point is computed for the precision airdrop based on the generated wind velocity map and a location of the dropzone target.

Other actions may be considered as well as part of method 600. For example, method 600 may further include releasing a payload from the airborne vehicle at the computed aerial release point. The payload may include one or more of an explosive device, fuel, and medical supplies, as examples. The payload may also include an actuator that can steer the payload while in the air.

Method 600 may also include controlling the airborne vehicle based on the respective wind characteristics to reduce turbulence experienced by the airborne vehicle. The airborne vehicle may be controlled via one or more actuators coupled to the airborne vehicle.

In another example, method 600 further includes displaying the generated wind velocity map to a pilot of the airborne vehicle. The map may be displayed, for example, on in instrument panel in the cockpit.

FIG. 7 is another method 700 of using a LIDAR system for increasing the accuracy of a precision airdrop according to another embodiment of the present invention. Each of stages 702 through 710 may be performed by one or more ground-based LIDAR systems.

At stage 702, according to an embodiment of the present invention, radiation is transmitted to target areas above a dropzone target as previously described. For example, radiation beams 411-1, 411-2, and 411-3 are transmitted over dropzone target 414 as illustrated in FIG. 4B.

At stage 704, according to an embodiment of the present invention, scattered radiation is received from the target areas as previously described.

At stage 706, according to an embodiment of the present invention, respective characteristics of the scattered radiation from each of the target areas are determined. These characteristics may, include one or more of a wind profile which contains speed and direction information, temperature, humidity, air pressure, etc. Additionally, these characteristics include wind velocities in any direction (including a vertical direction) at multiple points along an axis of one or more beams of radiation produced by the LIDAR system.

At stage 708, according to an embodiment of the present invention, a wind velocity map is generated based on the respective wind characteristics above the dropzone target. In one example, the wind velocity map is associated with time and location stamped data provided by a GPS.

At stage 710, according to an embodiment of the present invention, the wind velocity map is transmitted to one or more airborne vehicles. The wind velocity map data may be transmitted via satellite or RF communication. The one or more airborne vehicles may use the received wind velocity map data to compute an aerial release point for a precision airdrop onto the dropzone target.

While specific embodiments of the present invention have been described above, it will be appreciated that the present invention may be practiced otherwise than as described. The description is not intended to limit the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:

transmitting, by one or more transceivers in a LIDAR apparatus coupled to an airborne vehicle radiation from radiation source in the LIDAR apparatus to target areas between the airborne vehicle and a dropzone target;

receiving, by the one or more transceivers in the LIDAR apparatus, scattered radiation from the target areas wherein said target areas are at a plurality of altitudes between the airborne vehicle and the dropzone target;

determining respective wind characteristics of the scattered radiation from each of the target areas;

generating a three dimensional wind velocity map by volume averaging the respective wind characteristics between the airborne aircraft and at least the dropzone target; and computing an aerial release point for a precision airdrop based on the generated wind velocity map and a location of the dropzone target.

2. The method of claim 1, further comprising releasing a person or payload from the airborne vehicle at the computed aerial release point.

3. The method of claim 2, wherein the payload comprises one or more of supplies, an explosive device, fuel, vehicles, equipment, or medical supplies.

4. The method of claim 2, wherein the payload comprises an actuator configured to steer the payload while in the air.

5. The method of claim 1, further comprising controlling the airborne vehicle based on the respective wind characteristics so as to reduce turbulence experienced by the airborne vehicle.

6. The method of claim 1, wherein the determining respective wind characteristics comprises determining a wind velocity at multiple points along an axis of one or more beams of radiation.

7. The method of claim 6, wherein the determining a wind velocity comprises determining at least one of a horizontal wind velocity or a vertical wind velocity.

8. The method of claim 1, wherein the generating a wind velocity map further comprises generating a wind velocity map based on time and location stamped data provided by a GPS.

9. The method of claim 1, further comprising displaying the generated wind velocity map to a pilot of the airborne vehicle.

10. A LIDAR apparatus coupled to an airborne vehicle, the apparatus comprising:

a source configured to produce a beam;

a modulator configured to receive the beam and to produce one or more modulated beams;

one or more transceivers configured to receive the one or more modulated beams via a corresponding one or more optical fibers chosen from a first plurality of optical fibers, transmit the one or more modulated beams to target areas between the airborne vehicle and a dropzone target, and receive one or more scattered signals from the target areas, wherein said target areas are at a plurality of altitudes between the airborne vehicle and the dropzone target;

an optical mixer coupled to the one or more transceivers via a corresponding one or more optical fibers chosen from a second plurality of optical fibers, and coupled to the source via one or more optical fibers chosen from a third plurality of optical fibers, the optical mixer configured to receive the one or more scattered signals from the corresponding one or more transceivers, receive one or more reference beams from the source, and determine, for each of the one or more transceivers, a corresponding one or more Doppler shifts based on the respective one or more reference beams and the one or more scattered signals; wherein said scattered signals reflect time delays from a start of said produced beam, said time delays being commensurate with said plurality of altitudes; and a processor configured to generate a three dimensional wind velocity map between the airborne aircraft and at least the dropzone target based on the one or more Doppler shifts and volume averaging of the Doppler shifts at said target areas, and compute an aerial release point for a precision airdrop based on the generated wind velocity map and a location of the dropzone target.

11. The LIDAR apparatus of claim 10, wherein the one or more transceivers are gimbal-mounted to the airborne vehicle.

12. The LIDAR apparatus of claim 11, wherein the one or more transceivers are configured to direct the one or more modulated beams towards the dropzone target.

13. The LIDAR apparatus of claim 10, wherein the one or more scattered signals comprise a wind velocity associated with a corresponding target area.

14. The LIDAR apparatus of claim 13, wherein the wind velocity comprises at least one of a horizontal wind velocity or a vertical wind velocity.

15. The LIDAR apparatus of claim 10, further comprising a chassis configured to house the source, the modulator, and the optical mixer.

16. The LIDAR apparatus of claim 10, wherein the one or more transceivers are coupled to the chassis via optical fibers.

17. The LIDAR apparatus of claim 10, wherein the one or more transceivers are further configured to receive one or more scattered signals from at least 6 target areas.

18. A method comprising:

transmitting, by one or more transceivers in a LIDAR apparatus, radiation from a radiation source in the LIDAR apparatus to target areas above a dropzone target, wherein said target areas are at a plurality of altitudes between said LIDAR apparatus and said dropzone target;

receiving, by the one or more transceivers in the LIDAR apparatus, scattered radiation from the target areas;

determining respective wind characteristics of the scattered radiation from each of the target areas; generating a three dimensional wind velocity map by volume averaging the respective wind characteristics above the dropzone target; and transmitting the wind velocity map to one or more airborne vehicles.

* * * * *